United States Patent
Moreira Da Silva et al.

(10) Patent No.: US 11,884,877 B2
(45) Date of Patent: Jan. 30, 2024

(54) METHOD FOR REMOVING FOULING USING CARBONIC ACID

(71) Applicant: Petróleo Brasileiro S.A.-Petrobras, Rio de Janeiro (BR)

(72) Inventors: Fernando Antonio Moreira Da Silva, Rio de Janeiro (BR); Mario Germino Ferreira Da Silva, Rio de Janeiro (BR); Patricia Braga Gusmao, Rio de Janeiro (BR); Valtair Marcos Cristante, Rio de Janeiro (BR)

(73) Assignee: Petróleo Brasileiro S.A.-Petrobras, Rio de Janeiro (BR)

( * ) Notice: Subject to any disclaimer, the term of this patent is extended or adjusted under 35 U.S.C. 154(b) by 0 days.

(21) Appl. No.: 17/973,352

(22) Filed: Oct. 25, 2022

(65) Prior Publication Data

US 2023/0127921 A1    Apr. 27, 2023

(30) Foreign Application Priority Data

Oct. 25, 2021  (BR) ...................... 10 2021 021444 9

(51) Int. Cl.
| | | |
|---|---|---|
| *E21B 37/06* | (2006.01) | |
| *C09K 8/528* | (2006.01) | |
| *C09K 8/44* | (2006.01) | |
| *C09K 8/42* | (2006.01) | |

(52) U.S. Cl.
CPC .............. *C09K 8/528* (2013.01); *C09K 8/426* (2013.01); *C09K 8/44* (2013.01); *E21B 37/06* (2013.01)

(58) Field of Classification Search
None
See application file for complete search history.

(56) References Cited

U.S. PATENT DOCUMENTS

| | | | | |
|---|---|---|---|---|
| 5,146,988 A | * | 9/1992 | Paul .................... | C09K 8/528 |
| | | | | 166/305.1 |
| 5,403,493 A | * | 4/1995 | Mouche .................... | C02F 5/12 |
| | | | | 210/698 |
| 2020/0291761 A1 | * | 9/2020 | McColpin ............... | E21B 37/06 |

FOREIGN PATENT DOCUMENTS

BR         102019025415 A2     6/2021

OTHER PUBLICATIONS

Crabtree et al. (1999) "Fighting Scale—Removal and Prevention", Oilfield Review, 11:30-45.
Elayatt et al. (2016) "Evaluation of Diethylene Triamine-pentamethylene Phosphonic Acid (DTPMP) as Scale Inhibitor of Calcium Carbonate Scales in Oil Field Water", American Journal of Engineering Research, 5(12):130-142.

* cited by examiner

*Primary Examiner* — Andrew Sue-Ako
(74) *Attorney, Agent, or Firm* — Mintz Levin Cohn Ferris Glovsky and Popeo, P.C.

(57) ABSTRACT

The present invention refers to a method for removing fouling in carbonate reservoirs and/or depleted reservoirs by adding carbon dioxide to industrial or desulphated water to produce carbonic acid, in producing well stimulation operations, to be used as a weak acid for removing fouling in remote operation aiming at keeping the productivity of producing wells and lessening the need for remote operations with stimulation vessel, and therefore reducing operating costs.

4 Claims, 1 Drawing Sheet

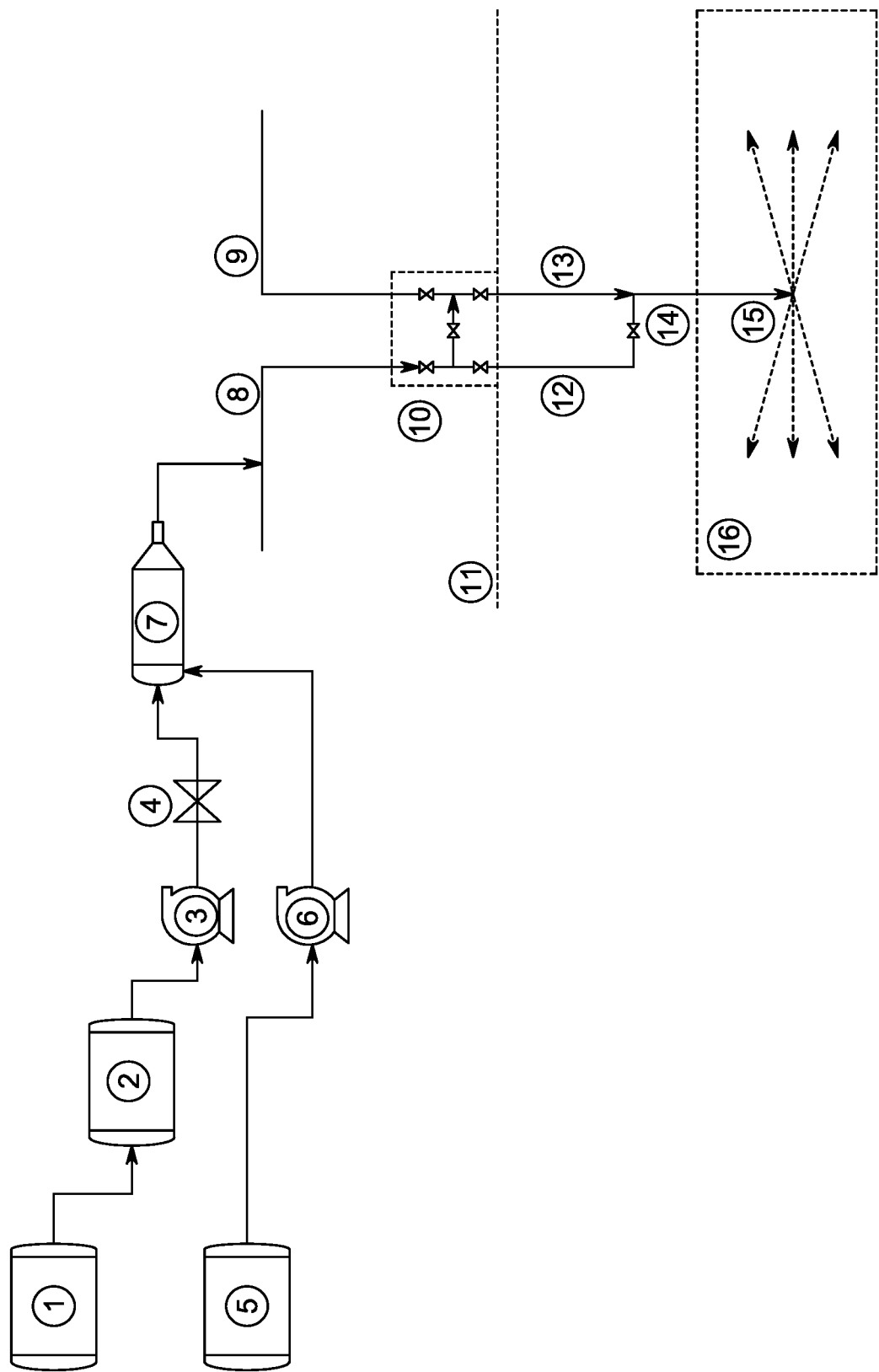

METHOD FOR REMOVING FOULING USING CARBONIC ACID

FIELD OF THE INVENTION

The present invention refers to a method for removing fouling/scale with application in carbonate reservoirs and/or depleted reservoirs, aiming at keeping the productivity of producing wells and increasing, through a method of adding carbon dioxide, the industrial or desulphated water in producing well stimulation operations, thus lessening the need for remote operations with stimulation vessel, and therefore reducing operating costs.

DESCRIPTION OF THE STATE OF THE ART

Currently, acid pumping with stimulation vessel is used for removing fouling. From a certain point in the productive life of some wells, there is a need for more frequent treatments, however, simulation studies on the occurrence of fouling have shown that the high gas-liquid ratio induced by gas lift injection can produce calcium carbonate deposits due to partial or total evaporation of produced water, in addition to wells with intelligent completion in very low BSW scenarios.

The occurrence of saline calcium carbonate fouling in the oil well production string and in the perforated-reservoir system is induced by changes in the production pressure, such as when the produced fluid changes from the static pressure confined in the reservoir to the flow pressure inside the well string, where gas expansion occurs, which alters the balance of calcium carbonate solubility in oil producing wells with low water content. This is also the case with gas lift injection. As the treatment frequency has increased along with the number of wells and the treatment frequency has increased significantly, issues that impact production management have arisen due to the costs associated with critical resources, the waiting queue for stimulation vessels to carry out chemicals removal operations, which result in the cash flow reduction due to the cost associated with production losses and the cost of the vessels itself. Another problem that can also arise in wells with high depletion and low productivity is that the cost of treatment with a stimulation vessel is no longer feasible.

For operational units having carbon dioxide production and carbon dioxide separation system, the industrial water generated in the Demineralization Unit (DU) or desulphated water used in secondary recovery, in case the industrial and/or desulphated water supply is available, these can carry out a fouling removal procedure by using the process of mixing industrial and/or desulphated water with carbon dioxide to produce carbonic acid for removing these calcium carbonate fouling deposit.

Document BR1020190254157A2 proposes a combined treatment of removing and inhibiting fouling in reservoir rock (inhibition squeeze), using organophosphonic acid-derived inhibitors, in an acid medium, aiming at reducing the intervention time in well fouling mitigation operations, in addition to reducing treatment costs and the risks associated with the process.

The reference ELAYATT, A K; ALTARHONI, H K; ELAOUD, A M (2016) "Evaluation of Diethylene Triamine-pentamethylene Phosphonic Acid (DTPMP) as Scale Inhibitor of Calcium Carbonate Scales in Oil Field Water", American Journal of Engineering Research, v. 5, p. 130-142 refers to phosphonates used as calcium carbonate scale inhibitor, in which a continuous dosage of inhibitor is suggested, emphasizing the application of the inhibitor diethylenetriamine pentamethylene phosphonic acid (DTPMP).

The study by CRABTREE, M. et al, (1999) "Fighting Scale-Removal and Prevention. Oilfield Review", 1999, v. 11, p. 30-45 deals with the removal and prevention of scale, referring to causes and what leads to scale formation, treatments and techniques used to remove scale and inhibitors that aids scale control.

Thus, no prior art document discloses fouling removal using carbonic acid from the mixture of carbon dioxide with industrial or desulphated water in a Stationary Production Unit (SPU) to produce carbonic acid to be used as a weak acid for removing fouling in remote operations such as that of the present invention.

Thus, in order to solve such issues, the present invention was developed, through which a remote treatment is made possible, that is, by the SPU, without using stimulation vessels for the wells in which this type of treatment is carried out, by adding carbon dioxide to industrial or desulphated water pads.

The technical advantages of the present invention are reduction of the operation's OPEX; increase in the NPV of operations due to the reduction of oil loss, since in case of availability of separation equipment or supply of industrial and desulphated water by the SPU, autonomous remote treatments can be carried out with a significant reduction in operating costs; simplification of the application of chemical products in remote treatments; anticipation of treatments as there will be no need for waiting for a window in the stimulation vessel schedule, which may reduce oil loss; reduce operational safety, health and environmental (SHE) risks.

Additionally, the cost of using chemicals is significantly reduced. In this way, this invention has technical advantages from the adequacy of the technology to the applied scenario, as well as economic and SHE advantages due to the reduction of costs associated with its application over the traditional technologies.

BRIEF DESCRIPTION OF THE INVENTION

The present invention refers to a method for removing fouling using a mixture of carbon dioxide with industrial or desulphated water in a SPU to produce carbonic acid to be used as a weak acid for removing fouling in remote operation. The carbonic acid produced is added to the fouling inhibitor, in which this mixture will be pumped through lines aligned with the service (or gas lift) line to be injected into the well string to the reservoir.

The present invention can be applied to carbonate reservoirs at high temperature with fluid produced at low gas-to-water ratios, as well as to depleted reservoirs at high temperature with fluid produced at high gas-to-water ratios, thus meeting the requirement for stimulation for fouling removal.

BRIEF DESCRIPTION OF THE DRAWINGS

The present invention will be described in more detail below, by referring to the attached FIGURE which represents, in a schematic way and not limiting the inventive scope, an example of its embodiment. The drawing contemplates the following:

FIG. 1 illustrates a schematic of the process for removing fouling using carbonic acid, in which are represented:

(1) Oil-Gas Separator;
(2) $CO_2$-Gas Separation System;

(3) System $CO_2$ Compressor;
(4) Pressure reducing valve;
(5) Tank for water additivation with hydrate inhibitor and corrosion inhibitor;
(6) Additive industrial water pump;
(7) Water $CO_2$ Atomizer;
(8) Well Gas-Lift Line;
(9) Well Production Line;
(10) Well Wet Christmas Tree;
(11) Mudline
(12) Well Annular;
(13) Production String;
(14) Gas-Lift Valve,
(15) Perforations;
(16) Reservoir.

DETAILED DESCRIPTION OF THE INVENTION

The method for removing fouling using carbonic acid according to the present invention and illustrated in FIG. 1 comprises the following steps of:
(1) aligning the carbon dioxide with the atomizer, in which it is used to mix $CO_2$ in industrial or desulphated water to produce the carbonic acid;
(2) aligning industrial or desulphated water with the atomizer to prepare the carbonic acid solution;
(3) adding the fouling inhibitor to carbonic acid produced by the above mixture;
(4) pumping the carbonic acid solution with fouling inhibitor through lines aligned with the service or gas-lift line to be injected into the well string to the reservoir;
wherein the injection of a volume of water is 1.5 times the volume of the production string, followed by water and diesel plug for displacement and injection into the formation.

By mixing the carbon dioxide ($CO_2$) with water, the production of carbonic acid ($H_2CO_3$) occurs, which, despite being a weak acid, can be used to remove calcium carbonate fouling. For stationary units in which the carbon dioxide is produced, it can be separately applied to produce carbonic acid in the SPU and applied to fouling removal operations for removing soluble inorganic deposits (calcium carbonate) from the production string and subsequently improving the solution by chemical additives with fouling inhibitors. The field of application will be in the carbonate reservoirs at high temperature with fluid produced with low gas-to-water ratio, and also can be applied to depleted reservoirs at high temperature with fluid produced with high gas-to-water ratio. This solution meets the requirement for calcium carbonate fouling removal stimulation, aiming at keeping the productivity of producing wells and increasing, through a process of adding the carbon dioxide, the industrial or desulphated water in producing well stimulation operations.

The present invention can be fully applied by the Lifting, Flow and Reservoirs areas, in the pre-salt producing fields having carbon dioxide separation, being addressed to the Reservoirs area in the reservoir management for managing the increase or maintenance of well production by controlling losses and ensuring the flow. It can be applied as a well intervention technology in the productivity restoration phase, through injection operations of carbonic acid into the string and the reservoir to remove calcium carbonate fouling. It can also be used in the application of fouling inhibitor associated with the carbonic acid in operations that can be classified as mixed (removal and inhibition) and, therefore, the application of this technology facilitates the fouling management for producing wells.

EXAMPLES

The following examples are provided in order to illustrate more completely the nature of the present invention and how to embody the same, without, however, being considered as limiting its contents.

The mixture of carbon dioxide produced with industrial and/or desulphated water in a pre-salt SPU to produce carbonic acid to be used as a weak acid for removing fouling in remote operation, is deemed as an innovation. However, this reaction of water with CO2 to produce carbonic acid, is already described in the literature by means of inorganic chemistry books. However, the result obtained by the invention, at first, can be measured using thermodynamic simulation. For example, studies performed on ARXIM geochemical simulator have demonstrated the dissolution of calcium carbonate by the mixture of water and carbon dioxide in different proportions and at different pH ranges.

It should be noted that, although the present invention has been described with respect to the attached drawings, amendments and adaptations can be performed by a person skilled in the art, depending on the specific situation, and provided that it is within the inventive scope defined herein.

The invention claimed is:

1. A method to remove calcium carbonate fouling, the method comprising:
   aligning carbon dioxide with an atomizer to prepare a carbonic acid solution;
   aligning water with the atomizer to prepare the carbonic acid solution;
   adding a calcium carbonate fouling inhibitor to the carbonic acid solution produced by mixing the carbon dioxide with the water to produce a carbon dioxide solution; and
   pumping the carbon dioxide solution through lines aligned with a service or gas-lift line to be injected into a well string within a reservoir, wherein the injection of a volume of the carbon dioxide solution into the well string is followed by water and diesel plug for displacement and injection into the reservoir.

2. The method, according to claim 1, wherein the water used is industrial or desulphated water.

3. The method, according to claim 1, wherein the volume of water injected is 1.5 times the volume of the well string.

4. The method, according to claim 1, wherein the calcium carbonate fouling is located within a carbonate reservoir.

* * * * *